United States Patent
Raghuramu et al.

(10) Patent No.: US 11,683,248 B2
(45) Date of Patent: Jun. 20, 2023

(54) INCREASING DATA AVAILABILITY

(71) Applicant: FORESCOUT TECHNOLOGIES, INC., San Jose, CA (US)

(72) Inventors: Arun Raghuramu, Milpitas, CA (US); Aveek Kumar Das, Santa Clara, CA (US); Yang Zhang, Fremont, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/723,799

(22) Filed: Dec. 20, 2019

(65) Prior Publication Data
US 2021/0194785 A1 Jun. 24, 2021

(51) Int. Cl.
| | |
|---|---|
| H04L 43/065 | (2022.01) |
| H04L 41/0813 | (2022.01) |
| H04L 43/062 | (2022.01) |
| H04L 43/0805 | (2022.01) |
| H04L 43/16 | (2022.01) |
| H04L 101/622 | (2022.01) |

(52) U.S. Cl.
CPC ........ H04L 43/065 (2013.01); H04L 41/0813 (2013.01); H04L 43/062 (2013.01); H04L 43/0805 (2013.01); H04L 43/16 (2013.01); H04L 2101/622 (2022.05)

(58) Field of Classification Search
None
See application file for complete search history.

(56) References Cited

U.S. PATENT DOCUMENTS

| | | | | |
|---|---|---|---|---|
| 7,300,730 | B1 * | 11/2007 | Willis | G03F 7/091 430/311 |
| 7,764,798 | B1 * | 7/2010 | Prather | H04R 25/554 381/23.1 |
| 8,572,219 | B1 * | 10/2013 | Shigapov | H04L 63/105 705/50 |
| 9,553,849 | B1 * | 1/2017 | Smalley | H04L 63/0428 |
| 10,242,193 | B1 * | 3/2019 | Babun | G06F 21/57 |
| 10,560,336 | B2 * | 2/2020 | Fainberg | H04L 67/10 |
| 10,621,164 | B1 * | 4/2020 | Kain | G06F 16/215 |
| 10,652,116 | B2 * | 5/2020 | Zhang | H04L 43/065 |
| 10,979,446 | B1 * | 4/2021 | Stevens | H04L 63/1433 |
| 11,211,165 | B1 * | 12/2021 | Nosrati | G16H 80/00 |

(Continued)

FOREIGN PATENT DOCUMENTS

AU 2013200233 A1 * 8/2013 ....... G06F 17/30336

*Primary Examiner* — Lance Leonard Barry
(74) *Attorney, Agent, or Firm* — Womble Bond Dickinson (US) LLP

(57) ABSTRACT

Systems, methods, and related technologies for increasing data availability. The determining of one or more recommendations to improve classification may include accessing network traffic from a network and selecting an entity. One or more values associated with one or more properties associated with the entity may be determined. The one or more values may be accessed from the network traffic. The entity may be classified and in response to the classification meeting a condition, one or more properties that are unavailable in the network traffic may be determined. A data source associated with the one or more properties for which a value is not present in the network traffic may be determined and the data source associated with the one or more properties that are unavailable in the network traffic may be stored.

18 Claims, 8 Drawing Sheets

(56) References Cited

U.S. PATENT DOCUMENTS

| | | | |
|---|---|---|---|
| 2011/0055122 A1* | 3/2011 | Andreoli | G06F 11/3466 |
| | | | 709/224 |
| 2014/0204803 A1* | 7/2014 | Nguyen | H04L 41/5054 |
| | | | 370/255 |
| 2018/0159751 A1* | 6/2018 | Zhang | H04L 63/0227 |
| 2018/0219742 A1* | 8/2018 | Fainberg | H04L 43/10 |
| 2018/0227203 A1* | 8/2018 | Khan | G06F 11/3433 |
| 2019/0026041 A1* | 1/2019 | Volvovski | G06F 3/0625 |
| 2019/0052531 A1* | 2/2019 | Sividia | H04L 41/082 |
| 2019/0238574 A1* | 8/2019 | Iliofotou | H04L 63/1425 |
| 2020/0136950 A1* | 4/2020 | D M | H04L 43/10 |
| 2020/0145288 A1* | 5/2020 | Mermoud | H04L 67/02 |
| 2020/0162503 A1* | 5/2020 | Shurtleff | H04L 41/0883 |
| 2020/0258516 A1* | 8/2020 | Khaleghi | G10L 15/22 |

* cited by examiner

500

Data Quality Statistics — 502

| | |
|---|---|
| Endpoint count | :772 |
| Classification On? | :Yes |
| Endpoints with Classification On | :216 |
| Function/OS classified by Manual Action | :Yes |
| Avg. Property Count Overall | :3.03 |
| Avg. Property Count for Endpoints with Unknown Function | :4.78 |
| Avg. Property Count for Endpoints with Known Function | :7.89 |
| Percentage of endpoints without DHCP Properties | :7.90% |
| Percentage of endpoints without Active Properties | :59.72% |
| Percentage of endpoints with Empty Hostinfo | :38.86% |
| Percentage of endpoints with no MAC Address | :39.66% |
| Percentage of endpoints with Unknown Function | :4.17% |
| Percentage of endpoints with Unknown Vendor | :25.46% |
| Percentage of endpoints with Unknown OS | :0.80% |

Fig. 5

INCREASING DATA AVAILABILITY

TECHNICAL FIELD

Aspects and implementations of the present disclosure relate to network monitoring, and more specifically, classification of entities of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5 depicts a diagram of aspects of an example command line interface including data quality statistics in accordance with one implementation of the present disclosure.

DETAILED DESCRIPTION

Figure 1:
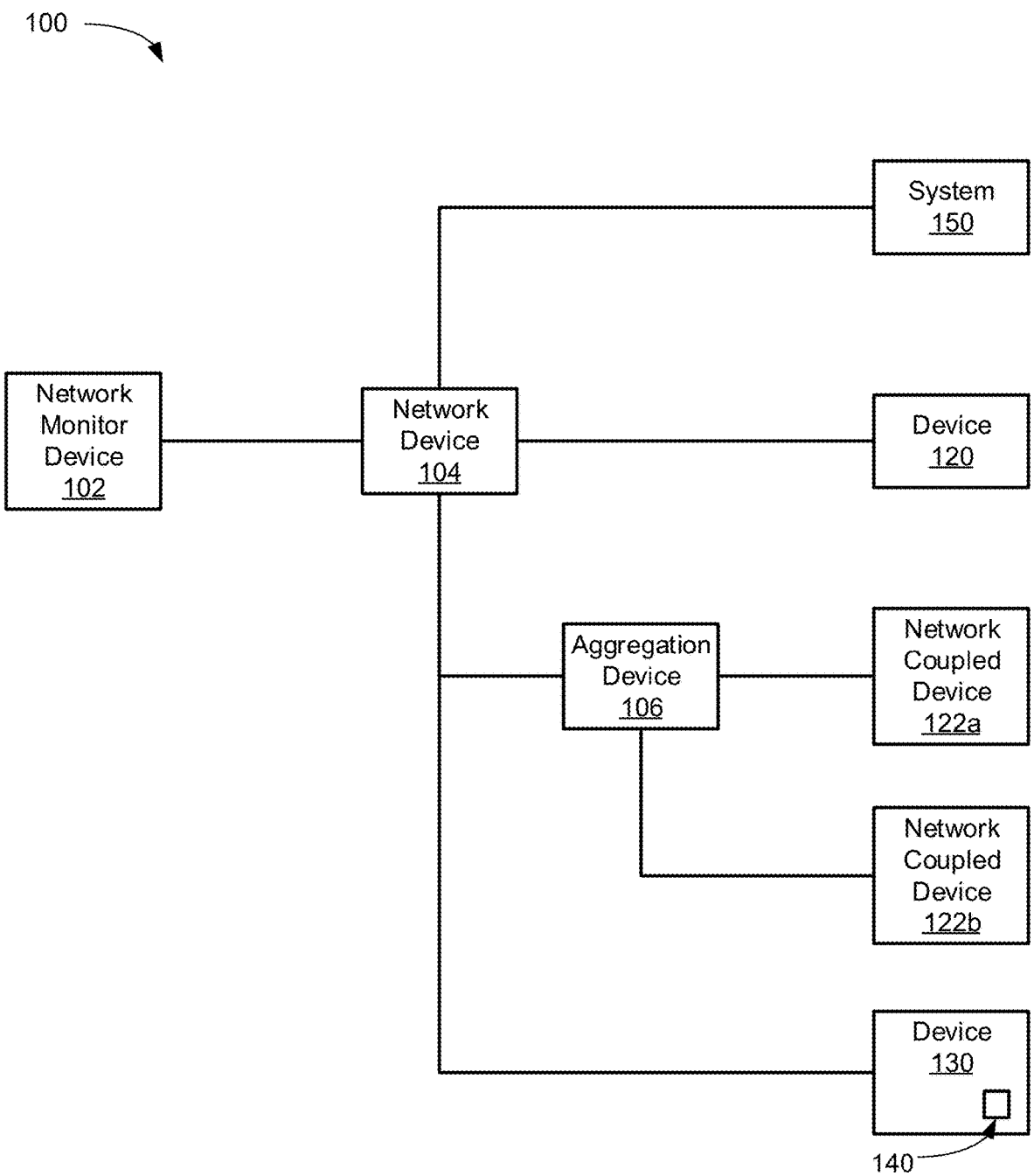
FIG. 1 depicts an illustrative communication network in accordance with one implementation of the present disclosure.

Aspects and implementations of the present disclosure are directed to classification (but may be applicable in other areas). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Classification is particularly important for securing a network because lack of knowledge about what a device is can prevent application of appropriate security measures.

Accordingly, described herein in various implementations are systems, methods, techniques, and related technologies, which enable more granular classification by determining and identifying data sources for properties that are unavailable in network traffic. The identification of one or more data sources that are unavailable in network traffic thereby enabling changes (e.g., in network configuration, policy changes, etc.) to make the data available for classification. The increase in data available for classification thereby enables increases in visibility into the devices communicatively coupled to one or more networks.

Many different properties may be relied on to arrive at a classification of an entity or device. The accuracy and granularity of visibility can be correlated with the availability of the specific property values and the specific profile library version. There are various situations, which may be due to lack of administrator or user knowledge, misconfiguration of one or more network monitoring devices, or characteristics of a network environment, that may result in many properties for classification not being observable, resolvable, or available thereby limiting classification and visibility. The result can be that a device is misclassified or a device not classified in a very granular or detailed manner. For example, this can be caused by certain properties not being available, e.g., active scanning properties, dynamic host configuration protocol (DHCP) properties, media access control (MAC) addresses, hypertext transfer protocol (HTTP) agent, etc. These can be caused by lack of access to network infrastructure, e.g., a switch, router, firewall, etc., (e.g., via a SPAN port), and thereby lack of access to the address resolution protocol (ARP) table of the network infrastructure which prevents access to the one or more MAC addresses of the ARP table. The lack of MAC address information can prevent the organizational unique identifier (OUI) vendor or NIC vendor from being available for classification. As another example, if switched port analyzer (SPAN) or port mirroring traffic is not available or only a single direction of SPAN traffic is accessible, then HTTP traffic and DHCP traffic may not be available. If a SPAN port or similar port is misconfigured, unidirectional traffic may be available which limits the traffic and data (e.g., HTTP agent, DHCP traffic, etc.) available for classification. Such issues can result in a poor user experience and many devices being classified as unknown or unclassified. Embodiments are able to identify data this is unavailable and make recommendations to make data more available for classification.

As classification is based on the properties available, having less properties available means that few or no classification profiles may match the available properties. This can mean that a device may be classified as unknown or only at a very high level (with low granularity), e.g., an internet technology (IT) device or operational technology (OT) device. The lack of a detailed classification limits information available to a user which can help the user to provide better security, control, etc.

Embodiments can identify situations where insufficient or incomplete data is available for classification due to misconfiguration of a network monitoring device, network configuration, other settings, etc. By identifying these situations, embodiments can provide information to an administrator or user to fix configuration issues thereby enabling better or improved classification. The increase in availability of information from fixing one or more configuration or settings issues means that more information or data, including properties, are available for classification and thereby more profiles can be matched. This enables better visibility into the entities of a network and allows issues with classification to be resolved with reduced to no outside assistance.

Improvements in classification in any environment may be proportional to the quality of the data available for classification. An extensive classification profile library is of limited effectiveness if properties are not available to match with the classification profile library. Embodiments are able to identify unavailable data and determine recommendations to increase the data available for classification.

The identification of insufficient data being available for classification can further include one or more checks of one or more configurations or usage based on information available. For example, the checks may include checking whether DHCP traffic is available for a segment, whether a profile library version is too old (e.g., older than a threshold or estimated to be old, for instance, beyond a threshold for regular releases or one or more months), whether manual classification actions have been used (e.g., by a user), whether data sharing is enabled (e.g., with a cloud resource), whether active scan data is available (e.g., due to active scanning not being enabled, due to SPAN port or port mirroring misconfiguration, firewall configurations (for instance local firewall and network firewalls), etc.), whether unidirectional traffic is being observed (e.g., due to a SPAN port or other port outputting unidirectional traffic, for instance due to misconfiguration), whether digital image and communications in medicine (DICOM) traffic is on a non-standard port, whether there are classification errors (e.g., misclassification, an entity being classified as multiple classification results, unknown or indeterminate device or entity classification, etc.). As another example, DHCP traffic or DHCP properties might be unavailable due to a network configuration (e.g., SPAN port not sending DHCP traffic), port customization, etc.

General checks may also be performed, including those for how many unknown classifications, multiple classifications, how many entities see types of traffic (e.g., network monitoring entities, for instance, network monitoring devices 102 and 280-282, that see DHCP traffic), how many entities are subject to active scanning, vertical, environment, etc. The information gathered from these checks can be shared with the user.

The checks can be based on the environment, vertical, deployment, segment type, and areas of the network that have been selected (e.g., by a user for checking or improving classification of a network portion). For example, in a healthcare environment, one or more checks for communications or protocols specific to a health care environment, e.g., DICOM®, may be performed. As another example, in an industrial or operational technology environment, checks for communications using protocols specific to an industrial environment, e.g., DNP3, Modbus, Profibus, may be performed. Checks based on a local deployment can be based on the checks being performed locally by a single network monitoring entity (e.g., network monitor device 102 or 280-282). Checks based on a deployment with multiple managed network monitoring entities (e.g., network monitor device 102 or 280-282) are managed by a network monitor manager entity (e.g., network monitor manager 286). The network monitor manager entity can orchestrate or coordinate the checks, recommendations determinations, etc., as described herein, among the multiple managed network monitoring entities. The output from each managed network monitoring entity can be combined by the network monitor manager.

The unclassified entities with unavailable data may be can be divided into the buckets or groups including: DHCP properties missing, session properties missing, HTTP properties missing, common active properties missing, SPAN or port mirroring traffic missing, OT properties missing (e.g., when an OT plugin or module is present). Absence of SPAN traffic or traffic blind spots (e.g., where traffic where traffic is unavailable or traffic is visible in only one direction, for instance, unidirectional traffic) can lead to a network monitoring entity not being able to resolve important traffic related properties important for classification.

Checks may be performed for traffic or communications on a non-standard or custom port. For example, if a MAC address (e.g., the OUI portion) is associated with a healthcare device manufacturer and there is traffic on a non-standard port, embodiments may prompt a user for the type of traffic (e.g., DICOM) or what protocol is being used with the non-standard port.

In some embodiments, a selection (e.g., by a user) of a network portion (e.g., segment), device types, etc., can be checked for configuration or classification issues, as described herein, based on a user identifying that classification is not satisfactory (e.g., below a threshold).

In various embodiments, the checks can be performed periodically, on demand, or policy triggered. The actions taken or changes made after the recommendations are presented or displayed can be used to determine feedback on the effectiveness of the checks, recommendations, or a combination thereof. For example, what changes result in the classification or significant changes or improvements in classification of which entities can be determined or tracked.

In some embodiments, a policy can be created to systematically manage unclassified entities and help a user (e.g., administrator) in analyzing reasons why some entities are unclassified, have multiple classifications, or have low granularity classifications. A classification process may be performed before the policy is run or executed.

The policy allows performing checks for the presence of important classification related data including properties thereby enabling determination of possible misconfigurations and common data quality issues leading to the unclassified entities or low granularity classification of one or more entities. In some embodiments, unclassified entities may be divided among buckets or groups for VPN user entities, entities with MAC address issues, and entities with important missing properties (e.g., DHCP properties, HTTP properties, active properties, OT properties, etc.).

In some embodiments, the host information for each entity or endpoint is analyzed to determine which properties are missing or unavailable. Based on the properties that are unavailable, suggestions or recommendations can be made to the user on how to improve classification. For example, if DHCP traffic is not present in the traffic, for instance due to a VPN configuration or a firewall configuration, then a suggestion could be made to change the VPN configuration or the firewall configuration. In some instances, VPN usage may result in local traffic not being available or visible. Traffic to a VPN concentrator or other entity with VPN functionality may be unavailable and in order for the traffic to be available, the entity with the VPN functionality needs to be configured to make the traffic available (e.g., for analysis for classification). Credentials may be prompted or used for the entity with the VPN functionality may be used to login and reconfigure the entity with the VPN functionality. In various instances, there may be a proxy involved with one or more VPN entities and changing the configuration of the proxy may be performed to allow the VPN traffic to the proxy to be available (e.g., for analysis for classification, etc.).

In some embodiments, MAC address information may be available once authentication to an entity with VPN functionality. The MAC address may be used (e.g., with other data, e.g., IP address, etc.) to create an identifier. The identifier can be used to indicate or notify a user that authentication information being unavailable can be an issue if an entity has not been classified.

Other classification issues can be based on use of an out of date classification or profile library or manual classifications not being shared such as with a repository (e.g., a cloud based resource), which for instance can improve the profile library based on crowd sourcing of some classifications. For example, an old or out of data classification or profile library may include one or more fingerprints or profiles for which updates have been released which would result in more classifications and less unknown classifications than using the old library. An older profile library therefore will be more likely to result in a classification of a device as unknown as compared to a new profile library. Embodiments are able to notify a user that a profile library is or likely is out of date (e.g., one or more updates of the profile library have been released).

In other cases, plugin misconfiguration (e.g., a plugin being stopped or misconfigured) can lead to unresolved properties (e.g., DHCP). In some cases, host (e.g., local software firewalls) or network firewalls can block active scans by a network monitoring device leading to Nmap and open port properties being unavailable. A misconfiguration of the passive classification functionality can lead to active properties being unavailable as well. For example, this may occur where a user (e.g., administrator) incorrectly or mistaken adds a network portion to passive classification group (e.g., an IP address range, segment, etc.), then a network monitoring entity may be unable (or is configured to not perform active scanning on that network portion) to determine active properties for the entities of the network portion. This can result in limited or reduce classification. Embodiments can check for plugin or module misconfigurations as described herein.

In some embodiments, the identifying of sufficient data available for classification can include gathering information from a user. This information can include a vertical (e.g., healthcare, OT, etc.), types of entities commonly encountered in the environment, entity types or segments for which classification is having an issue (e.g., below a confidence threshold), etc. In some embodiments, the vertical, common types of entities on a network, may be determined based on classifications of one or more entities on a network (e.g., a network with one or more MRI machines, X-ray machines, etc., can be determined to be a healthcare vertical or environment). In various embodiments, a vertical determined based on one or more entities of the network may be confirmed with a user (e.g., using a notification, displaying a prompt for confirmation, etc.). In some embodiments, the types of entities commonly encountered in the environment may be determined and confirmed with a user. In various embodiments, a determination of a classification and confirmation of the classification with a user may be done based on classification being below a threshold (e.g., a confidence threshold) or a number of unknown devices being above a quantity threshold, etc.

Certain protocols can run on certain well-known ports or be configured to run on custom ports. For example, a user may configure DICOM devices to use a custom port. Embodiments may prompt or notify a user to enter port information for a protocol that is being used on a custom or nonstandard port as part of the checks. Based on the custom port information, embodiments may then monitor communications over the port based the associated protocol, which can be used for classification, etc. In some embodiments, a user may be prompted or notified if traffic is accessed that is associated with a port that does not have a protocol associated with the port or where more than one protocol may use the port. Embodiments can support a user inputting information so that communication associated with a custom port can be used for classification.

Manual classification of a device may be available to allow a user to manually classify a device. Embodiments may check or access data associated with use of the manual classification and in response to a user not having used a manual classification function, may notify (e.g., display a message, send a notification, etc.) a user of the manual classification function to encourage the user to manually classify any unknown device or any device not classified with enough granularity (e.g., below a threshold, for instance a confidence threshold). Embodiments are able to upload information associated with the manual classification to a repository (e.g., cloud-based repository) thereby allowing improvement of the profile library (e.g., by updating the profile library based on the information associated with the manual classification).

In some embodiments, in the case of multiple classifications, one or more missing properties may be determined, if any, and a user may be prompted to perform a manual classification. In various embodiments, in the case of an unknown classification, one or more missing properties may be determined, if any, and a user may be prompted to perform a manual classification.

The traffic to and from a port can be treated as a client session property and can be accessed as part of the one or more checks. The traffic to and from a port can be used to match against a profile or fingerprint to classify an entity or device. For example, if a vendor is known to make IP cameras that uses TCP port 554 then traffic on TCP port 554 combined with the vendor based on the MAC address (e.g., from an ARP table on a switch) may be used to classify an entity as an IP camera made by the vendor.

Embodiments can include classification troubleshooting features which provide recommendations to enable more data to be available for classification. The recommendations may be based on checking data available that is being used for classification. If the results of the checks indicate that data quality is not good, or some configuration has been set in a way that is not ideal. A user can be presented with (e.g., via a graphical user interface, command line interface, etc.) the one or more recommendations, e.g., changes in configuration to increase the properties available for classification.

In some embodiments, the recommendations may include data quality metrics which are numerical indicators of the data quality obtained from an environment (e.g., via network traffic, via information directly from the one or more entities of the network, for instance using active scanning, etc.) and serve as feedback to the user for improving classification and visibility of entities in the environment.

The recommendations can be based on various checks. An initial classification of an environment or network may be performed and then one or more checks can be determined to determine data that is unavailable, as described herein. The checks can include whether the latest or most recent version of a data source plugin or module is installed. For example, whether a version of an OT environment plugin is current may be checked for an OT environment. Scripts that are installed, being used, or a combination thereof can be checked. The checks can also include checking if data is being uploaded to a cloud resource. For example, the data being uploaded can include how segmented a network is and if there are any suspicious traffic flows. The checks may further include checking if an entity that functions as a sensor (e.g., analyzing local traffic on an OT network) is configured correctly (e.g., OT properties are available for each entity on one or more networks).

VPN user entities can be unknown entities which are communicatively coupled through VPN to a network. Entities communicatively coupling through VPN commonly suffer low classification rates due to configuration and integration issues. For example, many VPN systems may not make the MAC address of an entity available. In other cases, the MAC address seen is the address of the VPN gateway and not the entity itself thereby making classification difficult. Firewall rules may also not permit active scans to upstream VPN devices. Embodiments can determine one or more recommendations based on if a VPN system supports providing MAC addresses. If so, an open or flexible plugin or module can be used, configured, or developed to communicate with the VPN system. If not, if the entities on the VPN are managed via remote inspection or an agent, then recommendations may include enabling remote inspection or an agent on the entities communicatively coupled via the VPN. This can enable embodiments to obtain the MAC addresses via remote inspect or an agent. The one or more recommendations may further include recommendations to fix firewall issues to allow scanning (e.g., active scanning) of the VPN entities (e.g., VPN infrastructure, entities communicatively coupled via VPN, etc.).

In some embodiments, an order of recommendations may be determined, e.g., based on the effectiveness of each recommendation. For example, if a recommendation to change a configuration so that MAC address data is available may result in a 60% improvement in classification, while a change to make DHCP data available may result in a 30% improvement in classification. The recommendations regarding the MAC address data may be put in order ahead of the recommendations associated with DHCP traffic. The order of the recommendations may be changed as more feedback is received or collected (e.g., of the effectiveness of each recommendation).

In some embodiments, the profile library may be checked to determine if it is older than a threshold (e.g., three months) and a recommendation to download a new or updated profile library may be made. In some embodiments, the recommendation to download a new or updated profile library may be based on updates to the profile library being available each month. In various embodiments, statistics may be presented of the number of new profiles (e.g., 100 profiles added) that are now in available in the profile library, a number of conflicts have been resolved, or a combination thereof.

In some embodiments, the change to the firewall configuration could be suggested and performed by embodiments (e.g., based on logging into the firewall and changing the configuration of the firewall). For example, if MAC addresses are unavailable in the network traffic, from a switch, from a VPN entity, or to a network monitoring entity (e.g., network monitor device 102), may have not been correctly configured to have MAC addresses available. Embodiments may recommend one or more changes to one or more network devices, a VPN device, or embodiments to enable the MAC addresses to be available.

Based on the identification of insufficient data being available for classification, one or more recommendations and data quality metrics can be determined, based on the one or more checks for one or more configurations or usage based on information. The one or more recommendations can be presented or displayed to a user or sent to the user as a notification, as described herein. The recommendations can include directions to perform one or more configuration changes, updates to software, updates to one or more profile libraries, network related changes, etc. The one or more recommendations can be displayed or sent to a user with instructions (e.g., text) describing how to fix or change network configuration or other settings to resolve the issue of information or data involving properties being unavailable for classification.

For example, if information or properties associated with active scanning are unavailable, a user may be directed to a portion of a graphical user interface to enable active scanning. It is appreciated that certain environments (e.g., healthcare, OT, manufacturing, etc.) may be sensitive to active scanning and as such active scanning may be limited or not be an option. The recommendations may be based on an environment or a vertical associated with one or more networks (e.g., based on feedback of classification improvement in other similar environment or vertical networks). For example, recommendations from a healthcare network may include ways to change a configuration for a DICOM device, where as a recommendation for an OT environment may include a way to change a configuration to make SPAN port or port mirroring traffic data available. The recommendations may further be based on the size of a vertical or environment, the types of devices on or more networks, or a combination thereof. The recommendations may be based on the different verticals having different general network organizations or segments, or different deployment practices (e.g., a single or local network monitor entity, for instance network monitor devices 102 or 280-282, or multiple managed network monitor entities, for instance, managed by network monitor manager 286).

Entities with MAC address issues can occur in several situations and potentially lead to an entity remaining unclassified or low granularity classification. For example, the situation of a MAC address not being available can be caused by an unmanaged switch where an entity communicatively couples from which a network monitoring entity (e.g., network monitoring device 102) is unable to read the ARP table from the unmanaged switch. Embodiments can recommend, create, or a combination thereof, a policy to detect and flag unmanaged switches to help identify issues with a MAC address being unavailable. For entities with private or locally administrated MAC addresses, checks can be performed on configurations to ensure that a network monitoring entity (e.g., network monitoring device 102) can obtain alternate data (e.g., DHCP traffic, active scanning data, etc.). For entities with an unknown vendor (e.g., unknown OUI), a recommendation of manual classification can be determined. A manual classification (e.g., by a user) can then be used to improve the profile library for classification (e.g., both locally and remotely).

A user may be prompted to confirm if a classification issue (e.g., classification granularity below a threshold, classification confidence below a threshold, etc.) has been resolved after the application of one or more recommendations.

Improvements in classification can be tracked as well. The improvement may be used as feedback to improve classification, as described herein. For example, if an information source is available after a configuration check which results in drastic classification improvement that can be tracked (and be part of the feedback). In some embodiments, a user may be able to submit feedback (e.g., a rating out of five stars). The feedback can be used to improve the checks and the recommendations. For example, as each recommendation is performed, the improvement in classification may be determined (e.g., as a percentage increase of entities classified). The feedback may then be analyzed using machine learning (e.g., to train a model). For example, the feedback could be used as a training data set for what recommendations worked, what recommendations did not work, and the degree to which the recommendation changed or improved classification.

In some embodiments, where manual actions have been used by the user, the manual classification may be used as feedback to identify misclassifications or improve the profile library with the manually entered classification.

Feedback from a user may be gathered including the results of the application of one or more recommendations. The feedback may include the information gathered from a user, the configurations checked, results of the configuration checks, usage information, recommendations, changes made after recommendations, changes in classifications of one or more entities. The feedback can be submitted (e.g., to a cloud resource or other repository) to enable further enhancement of classification and visibility features.

In various embodiments, an entity may be classified as multiple entities based on the information available matching multiple profiles and the information being insufficient to classify the entity as a single entity. A notification or prompt may then be sent or presented to a user to manually classify the device.

Often the reason for unclassified entities is a lack of good data. This can be thought of as:

Right configuration→right data→better classification

In some embodiments, a data quality indicator may be shown for host information to indicate the quality of the data available (e.g., available for classification). The indicator may be numerical (e.g., in the range of 0-100) and based on a function of the available information (e.g., DHCP traffic, active scan information, SPAN traffic, etc.) and act as a scorecard for data quality. In various embodiments, a graphical user interface (GUI) including the data quality indicator with different colors (e.g., a score of 0-20 can be red, 21-40 orange, 41-79 yellow, and 80-100 green, etc.) to give visual feedback to a user. Additionally, the data quality indicator can be for a particular network portion (e.g., a particular segment, for a collection of segments, a location, etc.).

Good quality data may be defined as data including properties that enable a classification to be above a particular threshold (e.g., confidence threshold). Bad quality data may be defined as data including properties that do not enable a classification to above a particular threshold (e.g., confidence threshold).

In some embodiments, a data quality metric or score may be determined to inform or communicate to a user the relative amount of data, e.g., including properties for classification, that is unavailable or missing or what information could be made accessible to further improve the overall classification. Embodiments are able to address the root cause of misclassification by addressing the data quality issue to increase the data available and thereby the number of properties that are available (e.g., for classification).

In some embodiments, the data quality score may have a range of 0-100. The data quality score can indicate the data quality associated with one or more network portions (e.g., segments), on an entity basis, or a combination thereof.

In various embodiments, the data quality score may be based on a score computed using this equation:

$$\text{score} = \sum_1^n weight_i \times \text{entity\_property} + \sum_1^m weight_j \times \text{network\_property}$$

Where weight is the weight associated with an entity property. For example, a weight associated with a particular entity being managed (e.g., with a lot of properties are available including, services, registry keys, vulnerability information, etc.) may be higher than a weight associated with a particular entity having open ports.

Where $entity\_property_i$ is the whether a particular entity property is present (e.g., 1) or missing (e.g., 0). In some embodiments, the entity property may be associated with whether an entity has a particular agent installed. For example, the $entity\_property_i$ may be the percent of entities that are actively managed. As another example, the $entity\_property_i$ may be the percent of entities that have agents.

Where $weight_j$ is the weight associated with a network property. For example, a weight associated with a DHCP property may be higher than a weight associated with an HTTP property.

Where $network\_property_j$ is whether a particular network property is present (e.g., 1) or missing (e.g., 0). For example, the $networkproperty_j$ may be the percent of the network that is actively scanned. As another example, the $network\_property_j$ may be the percent of network traffic available.

Where n is the number of entity properties (e.g., total number of entity properties) and m is the number of network properties (e.g., total number of network properties).

Embodiments are thus able to make a user aware of if data quality is affecting classification of one or more entities on a network. For example, embodiments may display or send a notification if a particular configuration is changed, then classification may be improved.

In some embodiments, a GUI component includes a wizard type interface running on an entity (e.g., network monitoring manager 286) managing one or more network monitor entities (e.g., network monitoring device 102), where the wizard type interface invokes the one or more checks of one or more configurations or usage based on information provided, as described herein. Based on the checks, one or more recommendations can be described herein. The wizard type interface may then be used to review and invoke one or more recommendations and associated actions, as described herein.

Figure 4:
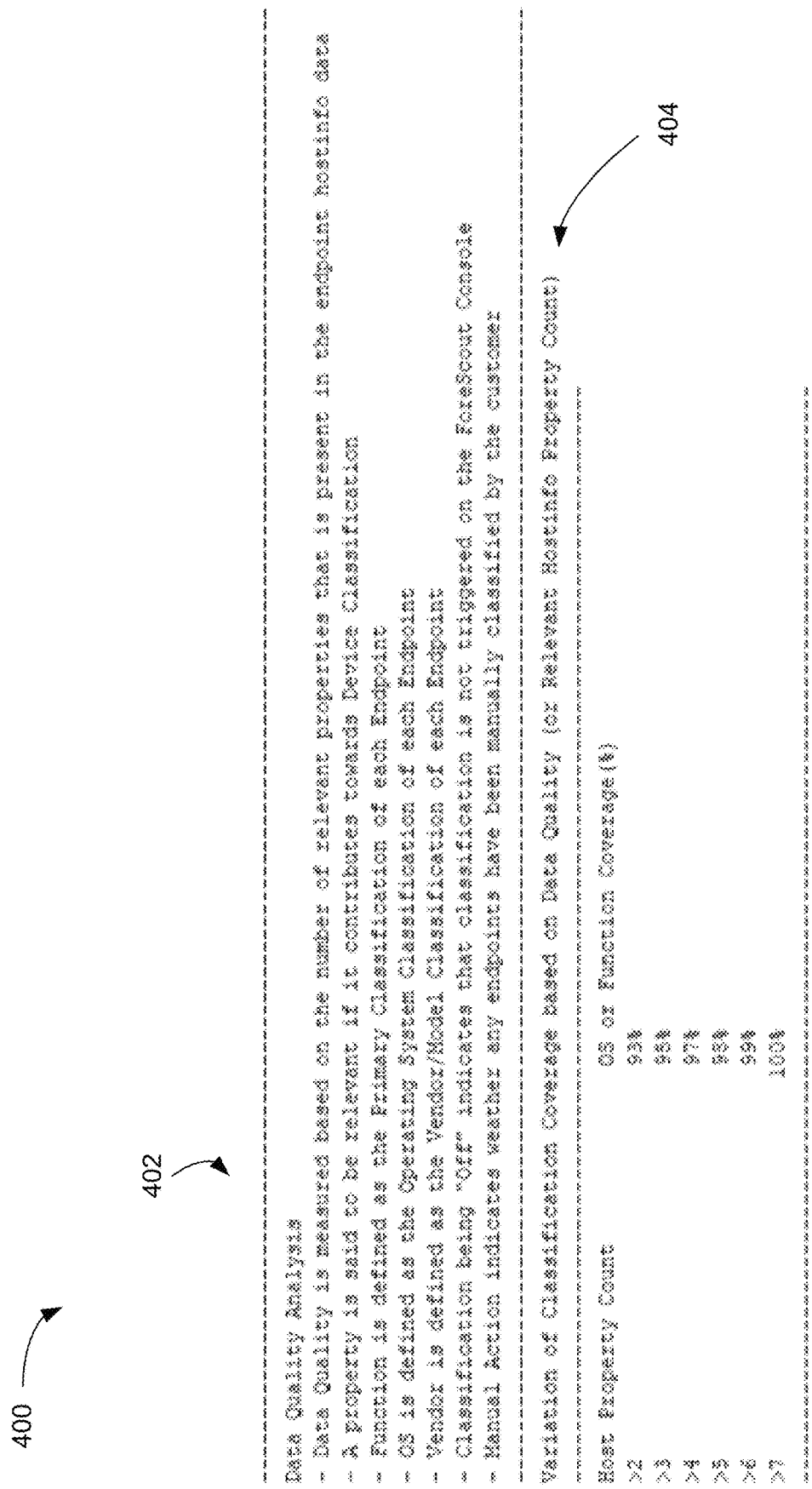
FIG. 4 depicts a diagram of aspects of an example command line interface including data quality in accordance with one implementation of the present disclosure.
Figure 6:
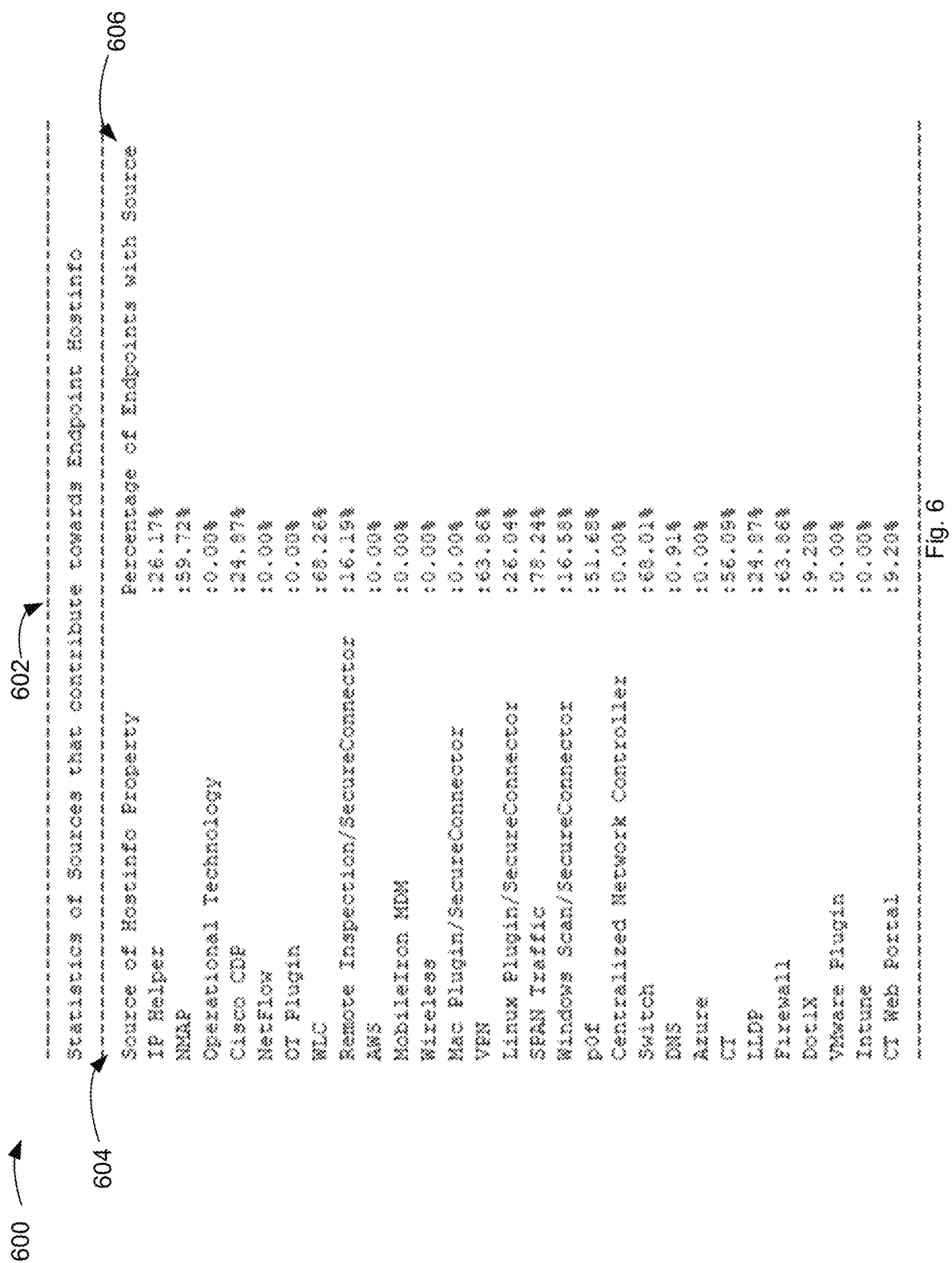
FIG. 6 depicts a diagram of aspects of an example command line interface including statistics of data sources in accordance with one implementation of the present disclosure.

In various embodiments, a command line interface (CLI) tool can be used to perform the one or more checks of one or more configurations or usage based on information provided, as described herein. Example output from a CLI tool are shown in FIGS. 4-6. In some embodiments, a VPN related flag may be stored in host information to identity if an entity has VPN tunneling.

Embodiments can determine data source issues on any network portion (e.g., one or more segments) and determine information or suggestions to resolve issues with data sources (e.g., change network configuration or access to enable access to data for classification). When embodiments are performed or executed on an entity managing (e.g., network monitoring manager 286) one or more network monitoring entities (e.g., one or more of network monitoring device 102), host information for each network monitoring entity can be analyzed and statistics shown (e.g., how many entities are visible and how many entities cannot be classified) related to each network monitoring entity. The statistics can include information associated with which properties and associated information are missing, e.g., SPAN information, DHCP information, active properties, etc. The data sources of each property may also be indicated and whether the data source is active or inactive. This information may give a user an idea if a portion of a network monitoring entity, a switch or other network device, or another network portion is misconfigured. In some embodiments, machine learning may be used to generate the suggestions on how to remedy limited classification or visibility situations.

Embodiments may operate in a distributed manner which allows scaling to the network size. A managing entity (e.g., network monitor manger 286) may push or install embodiments onto managed entities (e.g., network monitor devices 280-282) which the perform or execute embodiments. In some embodiments, the managing entity may be a cloud based entity. (e.g., executes or performs actions based on executing in a cloud). The managed entities (e.g., network monitor devices 280-282) may then perform the checks and determine recommendations, as described herein, and the results may be sent to a managing entity. This can allow monitoring of the data quality on each network portion associated with each network monitoring entity and associated metric or scores for each network monitoring entity. The data quality on each network portion associated with each monitoring entity and associated metrics or scores can be used to determine criticality (e.g., how critical the risk associated with a network portion is) of the one or more networks associated with the network monitoring entity.

Embodiments enable better understanding of deployment scenarios of a network monitoring entity (e.g., network monitor device 102) and best practices of users from different verticals (e.g., healthcare, financial, manufacturing, etc.). For example, a hospital or financial company may have a flatter network so it may be common for some switch login information may not be configured in a network monitoring entity which may result in host MAC address information being unavailable. Traditional IT companies may lack devices or ports to provide SPAN or mirror traffic, etc. This enables embodiments the possibility to provide custom configuration/deployment recommendations tailored to each user. For example, equipment recommendations of a list of specification can be provided.

Embodiments are operable to determine the areas where visibility is limited and provide information to a user to resolve limited visibility situations. Embodiments are able to analyze the available properties and other information and information of the causes of the limited visibility. The correlation of the available properties, other information, and information of the causes of the limited visibility enables correction of the causes of limited visibility solutions. Embodiments are able to enhance or refine the recommendations over time as feedback based on recommendations and the changes in classification after the recommendations are implemented. This can be performed using a cloud based resource or other repository for uploading recommendations and classification results after performance of each recommendation and providing information that can be used for determining recommendations and properties that are unavailable.

Embodiments may further advantageously be used as part of a setup process for a network monitor entity (e.g., network monitor device 102). For example, an initial setup may be done of a network monitor entity (e.g., network monitor devices 102, 280-282) and then embodiments may be used to determine if information for classification is unavailable to the network monitor entity and to determine one or more recommendations or actions that can be used to enable more information to be available for classification. Embodiments can thereby accelerate setup by identifying information that is unavailable for classification and determining one or more actions that can be taken to make the information for classification available.

Embodiments advantageously help resolve classification issues in an automated manner by identifying one or more properties unavailable in network traffic and data sources associated therewith. Embodiments enable understanding of current classification status and relation of the configuration of a network, configuration of a network monitoring entity, and other configurations, thereby enabling identification and resolving of areas where classification is limited. This enables users to learn where they can improve the configuration of their environment for maximum visibility. Visibility is also a precursor to classification so maximal visibility is key to achieving maximal classification. Embodiments thus allow a user to see where their visibility blind spots are and improve discovery and classification.

Advantageously, embodiments are configured for improving classification by identifying data (e.g., including properties) that is unavailable for classification and determining recommendations for increasing the data available for classification. The recommendations can include changes to configurations of network devices, updates to the profile library, input of credentials for network devices, etc. Embodiments thus enable increasing data including properties to improve classification.

Accordingly, described herein in various implementations are systems, methods, techniques, and related technologies, which enable improved classification. As described herein, improved classification can be enabled by the determination of recommendations to enable more data, including properties, to be available for classification.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or entities, as discussed herein, include devices (e.g., computer systems, for instance laptops, desktops, servers, mobile devices, IoT devices, OT devices, healthcare devices, financial devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment) and restricting communications between one or more network portions. Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including performing classification of entities of network 100, determining one or more checks (e.g., for data availability) based on the classification, determining one or more data sources that are unavailable, determining one or more properties that are unavailable, and determine one or more recommendations to increase data available for classification, as described herein. Network monitor device 102 may further perform one or more of the one or more recommendations automatically (e.g., without user involvement), upon user selection, or a combination thereof, as described herein.

Network monitor device 102 may provide an interface (e.g., a command line interface (CLI) or graphical user interface (GUI)) for viewing and monitoring classification along with data available for classification and data unavailable for classification. This can include a data quality metric or score, as described herein, along with associated statistics. Network monitor device 102 thereby is able to provide details of the current state of classification and indicators of where data in unavailable and one or more recommendations of how to increase data availability and thereby improve classification.

Network monitor device 102 may further perform a variety of operations including identification, classification, and taking one or more remediation actions (e.g., changing network access of an entity, changing the virtual local area network (VLAN), sending an email, sending a short message service (SMS) message, active actions, passive actions, etc.), as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
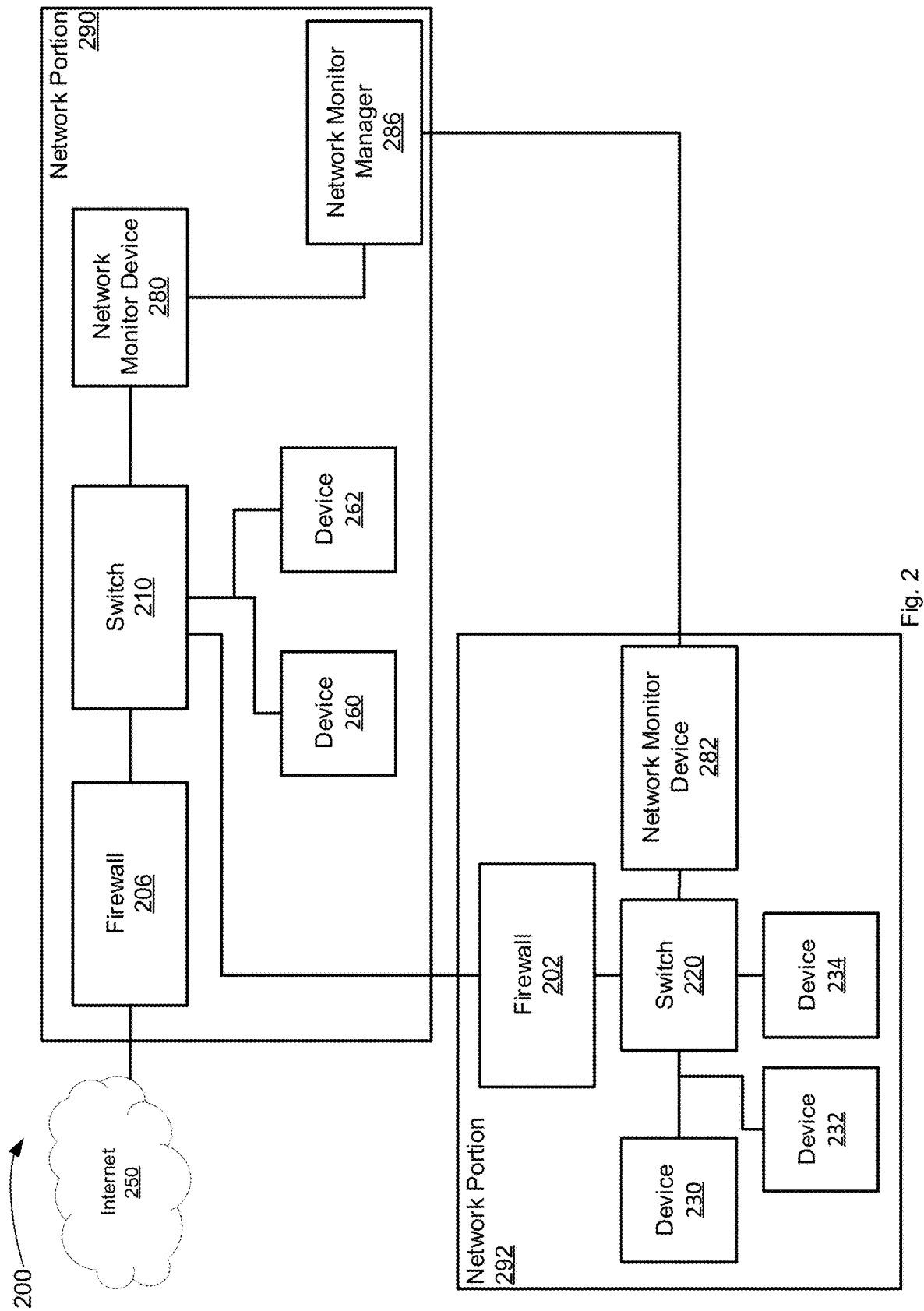
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor devices 280-282 (e.g., network monitor device 102) which can perform classification, as described herein, associated with the various entities communicatively coupled to example network 200. Network monitor devices 280-282 can further determine one or more checks to determine if data, including properties, is unavailable for classification and determine one or more recommendations to increase the data (e.g., and properties) available for classification, as described herein. The information gathered by network monitor devices 280-282 can be used to make changes (e.g., changes to network infrastructure configuration, etc.) to increase classification, etc., as described herein.

Example network 200 further includes network monitor manger 286 which is configured to manage network monitor devices 280-282. In some embodiments, network manager 286 is configured to manage classification of entities of example network 200. Network monitor manager 286 is operable to render, display, etc., a dashboard of various entity statistics and data from network monitor device 280-282. This can include entity classifications, data quality metrics, recommendations, etc., as described herein. This information may also be displayed or rendered by network monitor devices 280-282. Network monitor manager 286 may initiate one or more checks by network monitor devices 280-282 to check for data availability for classification, as described herein. Network monitor manger 286 may further aggregate, compile, etc., a plurality of recommendations for increasing data available for classification of the entities throughout example network 200 as determined by network monitor device 280-282. In some embodiments, network monitor manager 286 may be a cloud based entity (e.g., and be accessible via Internet 250). Network monitor manager 286 may monitor the version of the profile libraries of network monitor devices 280-282 to ensure that their profile libraries are up to date or current.

FIG. 2 shows example devices 230-262 (e.g., devices 106, 122a-b, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein. Enforcement points including firewalls 202-206 and switches 210-220 may be any entity (e.g., network device 104, cloud infrastructure, etc.) that is operable to allow traffic to pass, drop packets, restrict traffic, etc. Network monitor devices 280-282 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor devices 280-282 may be substantially similar to network monitor device 102. Embodiments support IPv4, IPv6, and other addressing schemes. In some embodiments, network monitor devices 280-282 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor devices 280-282, and devices 230-262. Firewalls 202-206 may perform network address translation (NAT) and firewall 202 may communicatively couple the devices 230-234, which are behind the firewall 202, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210-220 are enforcement points, as described herein.

Network monitor devices 280-282 are configured to identify, classify, determine one or more characteristics or properties of entities (e.g., devices 230-262), determine one or more checks for data available for classification, determine data and properties that are unavailable, determine one or more recommendations to increase data available for classification on network 200, as described herein. Network monitor devices 280-282 can access network traffic from network 200 (e.g., via port mirroring or SPAN ports of firewalls 202-206 and switches 210-220). Network monitor devices 280-282 can perform passive scanning of network traffic by observing and accessing portions of packets from the network traffic of network 200. Network monitor devices 280-282 may perform an active scan of an entity of network 200 by sending one or more requests to the entity of network 200. The information from passive and active scans of entities of network 200 can be used to classify the entity of network 200, determine one or more checks for data availability, and determine one or more recommendations to increase data available for classification, as described herein. The increase in data available for classification thereby allows improved classification.

As shown, network 200 includes network portions 290-292. Network portions 290-292 may be VLANs, SSIDs, segments, subnetworks, etc. Network monitor devices 280-282 may determine classifications for each entity of network portions 290-292 (e.g., based on data available on each of the network portions 290-292, etc.), as described herein. One or more of network portions 290-292 may be selected (e.g., by a user) for classification improvement by embodiments, as described herein.

For example, if SPAN traffic is unavailable from switch 210 then network monitor device 280 may not receive DHCP traffic, HTTP traffic, active scanning traffic, etc., which may result in limited granularity of devices 260-262, devices 260-262 being classified as multiple devices, or devices 260-262 being classified as unknown. Network monitor device 280 may determine one or more checks to be performed (e.g., for data available for classification) and perform the one or more checks, as described herein. Network monitor device 280 may determine one or more recommendations based on the one or more checks performed. The recommendations may include a recommendation to reconfigure or enable the SPAN port on switch 210 to send traffic to network monitor device 280. This recommendation could also be determined if traffic in only one direction (e.g., unidirectional traffic) is being received by network monitor device 280.

As another example, if MAC address information for device 260-262 is unavailable to network monitor device 280, the classification of devices 260-262 could be of limited granularity, multiple classifications, or unknown classifications. Network monitor device 280 may perform one or more checks (e.g., for network infrastructure credentials, etc.) and determine a recommendation to a user to provide or input into network monitor device 280 the credentials for switch 210. Network monitor device 280 can then access the ARP table of switch 210 and access the MAC addresses of devices 260-262 from the ARP table to classify devices 260-262.

Network monitor devices 280-282 may as part of the checks, check the version of the local profile library against the currently available profile library (e.g., available via Internet 250). If the local profile library is out of date, network monitor devices 280-282 may update the local profile library thereby increasing or improving the fingerprints available for classification.

Figure 3:
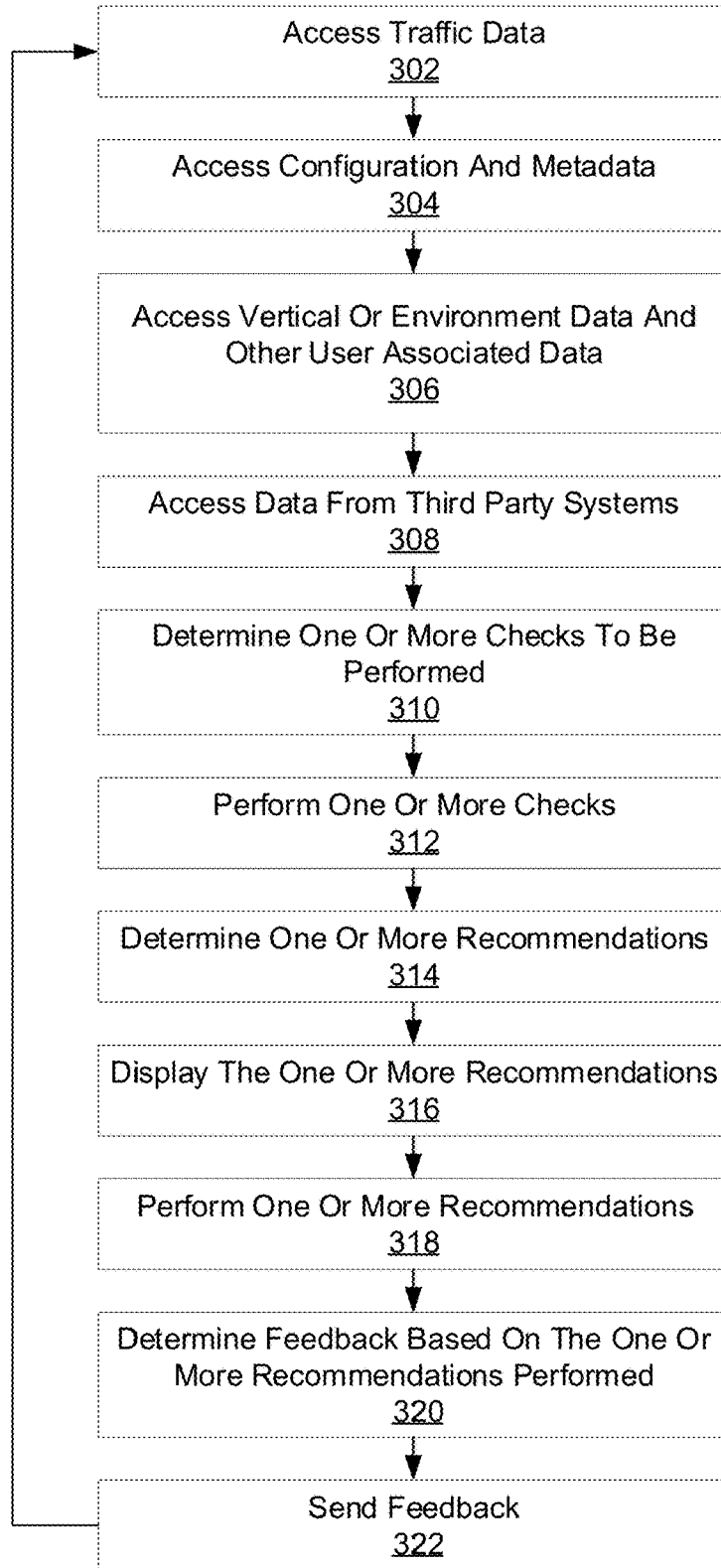
FIG. 3 depicts a flow diagram of aspects of a method for determining a data source to enhance classification in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for determining a data source to enhance classification in accordance with one implementation of the present disclosure. Various portions of flowchart 300 may be performed by different components (e.g., components of system 700) of an entity (e.g., network monitor device 102 or network monitor device 280). Flowchart 300 depicts a process for determining one or more checks for properties and one or more data sources that are unavailable, determining one or more recommendations associated with one or more data sources, and (optionally) performing one or more actions (e.g., changing a network configuration, sending or presenting a notification, etc.), as described herein. Flowchart 300 may be performed after an initial classification.

At block 302, traffic data is accessed. The traffic may be accessed by a network monitoring entity (e.g., network monitoring devices 102 or 280-282) via a port mirroring or SPAN port. The traffic data may include one or more properties for each entity communicatively coupled to one or more networks. The traffic may include active scanning properties (e.g., if active scanning is enabled).

At block 304, configuration and metadata are accessed. The configuration and metadata accessed may be configuration data and metadata of a network monitoring entity (e.g., network monitoring devices 102 or 280-282). This can include properties that the network monitoring entity is monitoring or collecting, software versions (e.g., of the profile library of the network monitoring entity), plugin or module version (e.g., that may be able to access data, for instance from other systems), etc., and the internal configuration or settings of the network monitoring entity (e.g., network monitoring devices 102 or 280-282). In some embodiments, one or more properties associated with one or more entities managed by a network monitoring entity.

At block 306, vertical or environment data and other user associated data is accessed. The data accessed may include vertical (e.g., industry), environment (e.g., branch, data center, campus, etc.), one or more selected (e.g., by a user) segments or network portions where there are issues (e.g., classification issues). In some embodiments, various information (e.g., vertical, common type of devices for the network or network portions, segments, areas with classification issues, etc.) may be obtained from a user (e.g., based on user entry, for instance, in response to a prompt to provide the information).

At block 308, data is accessed from third party systems (e.g., system 150, an external system, etc.). The data from third party systems may be accessed from the third party systems via a plugin or module of the network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

At block 310, one or more checks to be performed are determined. In some embodiments, the checks may be determined based on a classification of an entity meeting a condition. The condition can include at least one of a classification confidence value associated with the classification being below a threshold, a plurality of classifications associated with the entity, or an unknown classification. The one or more checks may be determined based on the data accessed (e.g., from the traffic, configuration and metadata, vertical or environment data and other user associated data, data from third party systems, etc.) and customized for the environment or entity types present. For example, the one or more checks determined for a hospital may include checks for DICOM communications whereas the one or more checks determined for an OT environment may not include checks for DICOM communications but instead for communications using common OT protocols.

At block 312, the one or more checks are performed. The checks may be performed based on the data available for classification, as described herein. In some embodiments, the performing of the checks includes computing metrics for data quality, data quality statistics, statistics for data sources (e.g., as shown in FIGS. 4-6), as described herein.

At block 314, one or more recommendations are determined. The recommendations may be based on a determination of which information or data is unavailable (e.g., from the traffic, configuration and metadata, vertical or environment data and other user associated data, data from various systems, etc.) based on the checks, as described herein. In some embodiments, one or more recommendations may be based on a determination of one or more properties that are unavailable in the information available from a system (e.g., an external system, an entity itself, etc.). The recommendations may also be based on a determined data quality, where a low data quality score may be used to determine recommendations. The recommendations may be ordered based on criticality, as described herein.

For example, some of the recommendations may be for resolving one or more entities being classified as unknown due to issues with a profile library as well as data quality or availability issues. If there were 50 devices that were classified as unknown based on having a single property for each device, that could be a data quality issue and the recommendations could include configuration changes to increase the data available for classification. If there were another 50 devices that were classified as unknown based on having five properties for each device, that could be a profile library issue and the recommendations could include updating the profile library.

The recommendations may be determined as text (e.g., instructions or lists of updates, configuration or other changes that could be made to increase data availability) or as automated actions (e.g., that performed automatically, for instance, without user input, or invoked via a button in a user interface). In some embodiments, the determination of recommendations may include determining updates, configuration changes, etc., to make MAC address information available, make DHCP information available, make VPN information available, and determine an ordering of the updates, configuration changes, etc., that should be performed, as described herein.

At block 316, one or more recommendations are displayed. The recommendations may be displayed in a command line interface or graphical user interface. The recommendations may be displayed based on order of priority or criticality, as described herein.

At block 318, one or more recommendations are performed. In some embodiments, the recommendations may be performed automatically or invoked via a button in a user interface. In various embodiments, the recommendations may be performed based on user input to perform specific recommendations.

At block 320, feedback is determined based on the one or more recommendations performed. The feedback may be based on improvement of classification for each recommendation performed, as described herein.

At block 322, the feedback is sent. The feedback may be sent to a cloud based resource or other repository where the feedback can be used to further improve the check determinations, the one or more checks, the one or more recommendation determinations, and classification.

Block 302 may then be performed, e.g., on a periodic, prompt (e.g., user prompted basis), a schedule, cloud service based schedule, or based on a policy. For example, a policy may be created for entities, network portions, etc., that are associated with low or poor data quality (e.g., below a threshold). The policy can automatically invoke process 300 in response to low data quality for the one or more entities, network portions, etc., associated with the low data quality (and reduced classification).

While example user interfaces 400-600 of FIGS. 4-6 may be described with respect to devices or device groups, embodiments support other entities (e.g., users, services, etc.). User interfaces 400-600 may be rendered or displayed by an entity or device (e.g., network monitor device 102 or network monitor devices 280-282, network monitor manager 286). The example user interfaces 400-600 may be command line interfaces, graphical user interfaces, etc. The example user interfaces 400-600 may be part of a dashboard, webpage, and be based on cloud collected information (e.g., from one or more networks) and based on information from one or more network monitoring devices (e.g., network monitor device 102 or 280-282).

FIG. 4 depicts a diagram of aspects of an example command line interface including data quality in accordance with one implementation of the present disclosure. A data health indicator or data quality metric can represent an overall metric for how much data is available to be used for visibility, classification, etc. Example interface 400 is configured for viewing variation of classification coverage based on data quality. Example interface 400 includes description of data quality 402 and table 404.

Example user interface 400 includes a summary of the results of the previous checks (e.g., checks for data) and a summary result of how well the available data is being used for visibility or classification. In some embodiments, a button or option may be presented that allow viewing of additional statistics or show changes that can be made to increase data availability or reduce the amount of unavailable data.

In various embodiments, a data quality metric can be based on having a number of points or score associated with data being unavailable from various sources of information. For example, SPAN traffic being unavailable could be associated with a score of 30 points or DHCP traffic being unavailable could be worth 20 points (where a higher score is worse). As another example, having a single unclassified device could be worth one point whereas 50 unclassified devices could be worth 50 points.

Table 404 depicts percentages of coverage of entities associated with various numbers of properties. Table 404 includes column 410 and column 412. Column 410 includes the host property count or number of properties associated with the entities being classified. Column 412 includes the operating system (OS) or function coverage percentage for the number of properties in the associated row of column 410. The coverage percentage reflects that the more data or properties available the better the configuration (e.g., network device configuration, plugin or module configuration, etc.) and the better visibility. For example, FIG. 4 shows that when there are greater than seven properties available for each host or entity, 100% of the OS or function is known or classified. This shows that the better the configuration, the more data available, and thereby the better the classification.

FIG. 5 depicts a diagram of aspects of an example command line interface including data quality statistics in accordance with one implementation of the present disclosure. Example graphical user interface (GUI) 500 is configured for viewing various data quality statistics associated with classification.

Example GUI 500 includes table 502. Table 502 shows data quality statistics on an endpoint (e.g., device or entity) basis. Example interface 500 depicts that active scanning properties, DHCP properties, hostinfo, and MAC address information are unavailable for various percentages of endpoints. This can be indicative that there are information availability or configuration issues that could be reducing classification quality or accuracy that should be resolved to improve classification. For example, this could be caused by DHCP traffic or other traffic not being available via one or more SPAN ports on a network.

The percentages of table 502 can help a user understand where to make changes to allow data relevant to classification to be made available. For example, the percentage of endpoints with no MAC address can indicate that access to certain network equipment is unavailable (e.g., credentials for particular network switches are unavailable so the ARP tables of those switches are unavailable).

Table 502 further indicates whether manual actions have been used to classify the Function/OS of entities of a network. For example, by indicating Yes or No in relation to Function/OS classified by Manual Action as shown in FIG. 5.

Embodiments can further support statistics of associated with entities associated with misclassifications, multiple classifications, DICOM, unidirectional traffic, etc. In some embodiments, a criticality may be associated with each type of information. For example, having the function or operating system may be critical for each entity while having active scan traffic may not be as critical. Changes can be determined with respect to data sources (SPAN traffic, DHCP traffic, etc.) associated with critical properties (e.g., function, operating system, etc.). The changes determined to be associated with critical properties can be presented or displayed (e.g., to a user) first or with an indicator to reflect the critical nature of the associated property or data source. This can thereby encourage the changes associated with critical properties or data sources to be performed first.

In some embodiments, network monitoring entities may be ranked and the segments associated with each network monitoring entity may be ranked based critical properties that are unavailable. This can be based on the network monitoring entities and segments having different configurations. This can allow prioritization of which network portions to focus on first.

FIG. 6 depicts a diagram of aspects of an example command line interface including statistics of data sources contributing to host information in accordance with one implementation of the present disclosure. Example graphical user interface (GUI) 600 is configured for viewing risk statistics of sources of information that contribute toward endpoint hostinfo or host information. Example GUI 600 includes table 602 which includes columns 604 and 606.

Table 602 indicates whether a source of information is available (e.g., >0%) or unavailable (e.g., 0%). The percentage being greater than zero reflects that properties associated with that source are available. A percentage of zero indicates that the source or data source is unavailable. If the percentage is zero, that may indicate that the source is unavailable or there is a configuration issue with the data source. For example, if the SPAN traffic source is associated with zero percent of endpoints, that would indicate that one or more SPAN ports are not configured correctly. As another example, if a VPN data source is associated with a zero percent of endpoints, that may indicate that a VPN plugin or module is not configured, is not functioning, etc.

Sources of data are listed in column 604. Column 606 shows the percentage of endpoints for which a particular data source provides data or properties. IP Helper is a general data source that provides general network information (e.g., IP addresses, etc.) associated with entities. In some embodiments, the information sources are associated with plugins for a network monitoring entity (e.g., network monitoring device 102) for interfacing with various sources of information (e.g., switches, cloud resources, SPAN, Nmap, VPN resources, virtual environments, etc.).

For example, table 602 depicts that information from switches are available for 68.01% of the endpoints, DNS information is available for 1% of the switches, and Azure information is unavailable or not available for any of the endpoints.

Example interface 600 may include more or fewer information sources based on an environment or vertical is being monitored or scanned. For example, an information technology environment might not have OT information sources available. As another example, an OT environment might not have a Windows™ information source or virtual environment (e.g., VMware™) information source available. In some embodiments, the list of information sources is tailored based on the information gathered, as described herein, e.g., vertical, types of devices commonly encountered in the environment, device types and segments where there is a classification issue, etc.

Figure 7:
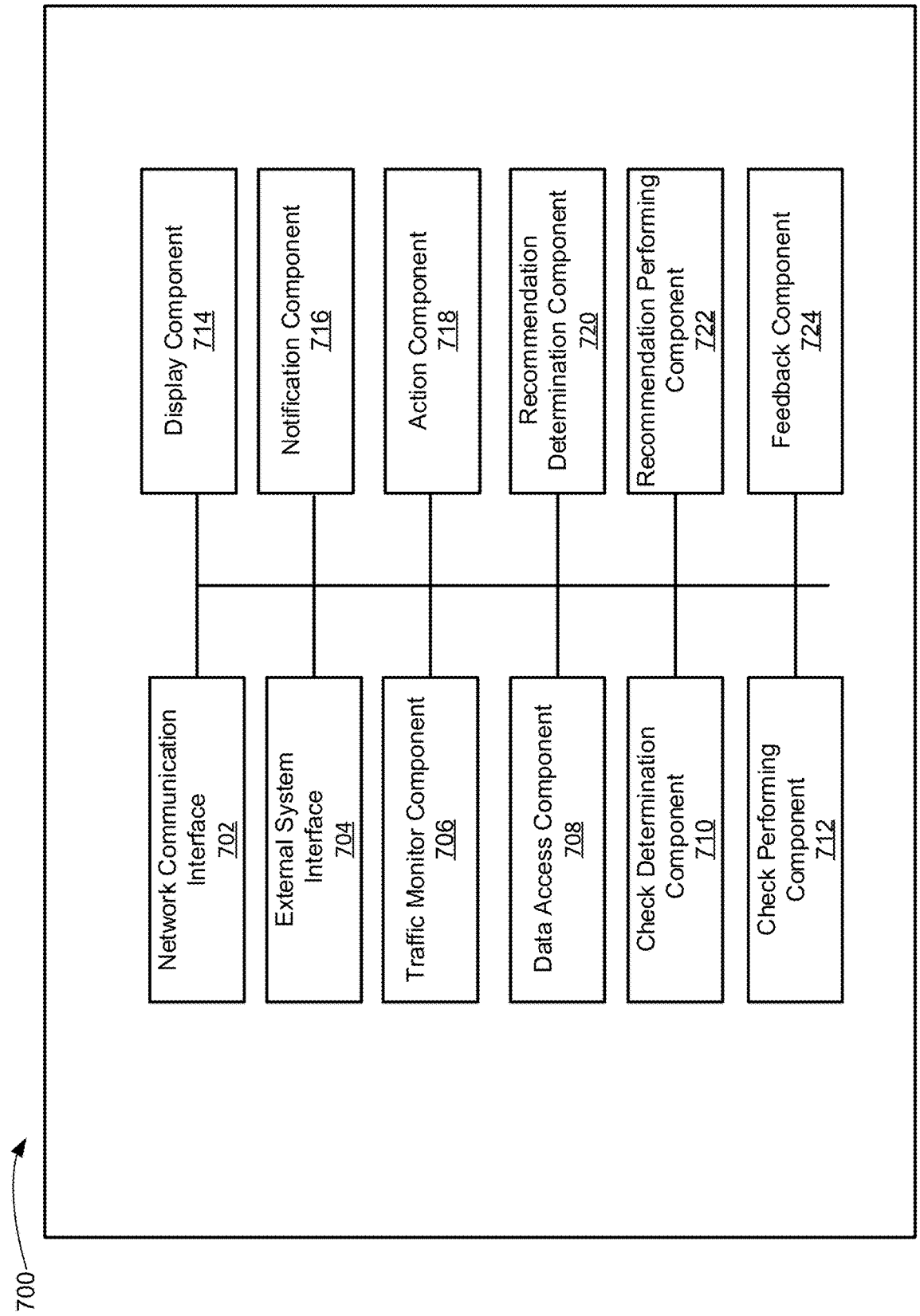
FIG. 7 depicts illustrative components of a system for determining a data source to enhance classification in accordance with one implementation of the present disclosure.

FIG. 7 illustrates example components used by various embodiments. Although specific components are disclosed in system 700, it should be appreciated that such components are examples. That is, embodiments are well suited to having various other components or variations of the components recited in system 700. It is appreciated that the components in system 700 may operate with other components than those presented, and that not all of the components of system 700 may be required to achieve the goals of system 700.

FIG. 7 depicts illustrative components of a system for determining a data source to enhance classification in accordance with one implementation of the present disclosure. Example system 700 or classifier 700 includes a network communication interface 702, an external system interface 704, a traffic monitor component 706, a data access component 708, a check determination component 710, a check performing component 712, a display component 714, a notification component 716, an action component 718, a recommendation determination component 720, a recommendation performing component 722, and a feedback component 724. The components of system 700 may be part of a computing system or other electronic device (e.g., network monitor device 102 or network monitor devices 280-282) or a virtual machine or device and be operable to monitor one or more entities communicatively coupled to a network, monitor network traffic, and classify the one or more entities, as described herein. For example, the system 700 may further include a memory and a processing device, operatively coupled to the memory, which may perform the operations of or execute the components of system 700. The components of system 700 may access various data and characteristics or properties associated with an entity (e.g., network communication information or traffic), data associated with one or more entities (e.g., from network devices, local resources, cloud resources, external systems, for instance system 150), etc., as described herein. It is appreciated that the modular nature of system 700 may allow the components to be independent and allow flexibility to enable or disable individual components or to extend, upgrade, or combination thereof components without affecting other components thereby providing scalability and extensibility. System 700 may perform one or more blocks of flow diagram 300.

Communication interface 702 is operable to communicate with one or more entities (e.g., network device 104, firewalls 202-206, switches 210-220, other devices coupled thereto, devices 230-262, etc.) coupled to a network that are coupled to system 700 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 702 may be operable to work with one or more components to initiate access to characteristics or determination of characteristics of an entity to allow determination of one or more properties which may then be used for device compliance, asset management, standards compliance, classification, identification, etc., as described herein. Communication interface 702 may be used to receive and store network traffic for determining properties, as described herein.

External system interface 704 is operable to communicate with one or more third party, remote, or external systems to access information including characteristics or attributes associated with an entity. External system interface 704 may further store the accessed information in a data store. For example, external system interface 704 may access information from a vulnerability assessment (VA) system to enable determination of one or more compliance or risk characteristics associated with the entity. External system interface 704 may be operable to communicate with a vulnerability assessment (VA) system, an advanced threat detection (ATD) system, a mobile device management (MDM) system, a firewall (FW) system, a switch system, an access point (AP) system, etc. External system interface 704 may query a third party system using an API or CLI. For example, external system interface 704 may query a firewall or a switch for information (e.g., network session information) about an entity or for a list of entities (e.g., an ARP table) that are communicatively coupled to the firewall or switch and communications associated therewith. In some embodiments, external system interface 704 may query a switch, a firewall, or other system for information of communications or properties associated with an entity.

Traffic monitor component 706 is operable to monitor network traffic to determine if a new entity has joined the network or an entity has rejoined the network and monitor traffic for analysis by check determination component 710, check performing component 712, recommendation determination component 720, recommendation performing component 722, and feedback component 724, among others, as described herein. Traffic monitor component 706 may have a packet engine operable to access packets of network traffic (e.g., passively) and analyze the network traffic. The traffic monitor component 706 may further be able to access and analyze traffic logs from one or more entities (e.g., network device 104, system 150, or aggregation device 106) or from an entity being monitored. The traffic monitor component 706 may further be able to access traffic analysis data associated with an entity being monitored, e.g., where the traffic analysis is performed by a third party system.

Data access component 708 is operable for accessing data including metadata associated with one or more network monitoring entities (e.g., network monitor devices 102 or 280-282), including properties that the network monitoring entity is monitoring or collecting, software versions (e.g., of the profile library of the network monitoring entity), and the internal configuration of the network monitoring entity. Data access component 708 may further access vertical or environment data and other user associated data, including vertical, environment, common type of devices for the network or network portions, segments, areas with classification issues, etc., as described herein.

Check determination component 710 is operable to determine one or more checks to be performed, as described herein. The checks may be based on classification results (e.g., unknown classifications, multiple classifications, low granularity classifications, etc.) and the checks may be determined or configured to determine data available for classification. For example, a check may check for whether SPAN traffic is available, or MAC addresses information is available or if DICOM traffic is present on the network.

Check performing component 712 is operable to perform the one or more checks, as described herein. The performing of the checks may include determining whether credentials are available for one or more network devices, whether there are devices using VPN, how one or more SPAN ports are configured, etc.

Display component 714 is configured to optionally display one or more graphical user interfaces or other interfaces (e.g., command line interface) for depicting various information associated with entities or devices, one or more checks to be performed, results of one or more checks, one or more recommendations, various classification related statistics, etc., as described herein.

Notification component 716 is operable to initiate one or more notifications based on the results of monitoring communications or attributes of one or more entities (e.g., alerting of an unknown classification, a low granularity classification, etc.), as described herein. The one or more notifications could also include one or more recommendations, as described herein. The notification may be any of a variety of notifications, e.g., IT ticket, email, SMS, a HTTP notification, etc., as described herein.

Action component 718 is operable for initiating or triggering one or more remediation actions or security actions according to one or more policies, e.g., based on a classification of an entity, as described herein. Action component 718 may further be configured to perform other operations including checking compliance status, finding open ports, etc. Action component 718 may restrict network access, signal a patch system or service, signal an update system or service, etc., as described herein. The action component 718 may thus, among other things, invoke automatically patching, automatically updating, and automatically restrict network access of an entity (e.g., that has out-of-date software or based on access rule violation or attempted violation), automatic change of an entity to another network portion (e.g., VLAN), as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Recommendation determination component 720 is operable to determine one or more recommendations (e.g., based on the results of checks), as described herein. The one or more recommendations may include changing the configuration on a SPAN port or port mirroring port, changing the configuration on VPN associated entities, inputting credentials for one or more network entities (e.g., network switches), etc., as described herein.

Recommendation performing component 722 is operable to perform one or more of the one or more recommendations (e.g., determined by the recommendation determination component 720), as described herein. For example, recommendation performing component 722 may use network credentials to change the configuration of a SPAN port to increase the data available for classification or use network credentials to access an ARP table of a network device.

Feedback component 724 is operable to determine feedback based on the performance of the one or more recommendations, as described herein. Feedback component 724 may further be operable to provide the feedback to a cloud-based resource or other repository to allow improvement of classifier 700.

The system 700 may be software stored on a non-transitory computer readable medium having instructions encoded thereon that, when executed by a processing device, cause the processing device to access network traffic from a network and select an entity. The instructions may further cause the processing device to determine one or more values associated with one or more properties associated with the entity, where the one or more values are accessed from the network traffic. The instructions may further cause the processing device to determine a classification of the entity and in response to the classification meeting a condition, determine, by the processing device, one or more properties that are unavailable in the network traffic. The instructions may further cause the processing device to determine a data source associated with the one or more properties for which a value is not present in the network traffic; and store the data source associated with the one or more properties that are unavailable in the network traffic.

In some embodiments, the instructions may further cause the processing device to perform an action with respect to the data source associated with the one or more properties that are unavailable in the network traffic. In various embodiments, the action with respect to the data source associated with the one or more properties that are unavailable in the network traffic comprises at least one of changing a configuration of one or more network devices, changing a configuration SPAN or mirror port, adding network infrastructure login information, or getting an updated profile library. In some embodiments, the one or more properties that are unavailable in the network traffic is associated with at least one of dynamic host control protocol traffic (DHCP), active scanning, hypertext transfer protocol (HTTP) traffic, a profile library being out of date, media access control (MAC) address, unidirectional traffic, or an address resolution protocol (ARP) table.

In various embodiments, the condition comprises at least one of a classification confidence value associated with the classification being below a threshold, a plurality of classifications associated with the entity, or an unknown classification. In some embodiments, the instructions may further cause the processing device to display a notification comprising a reference to the data source associated with the one or more properties that are unavailable in the network traffic. In various embodiments, the notification comprises a message to perform a manual classification.

Figure 8:
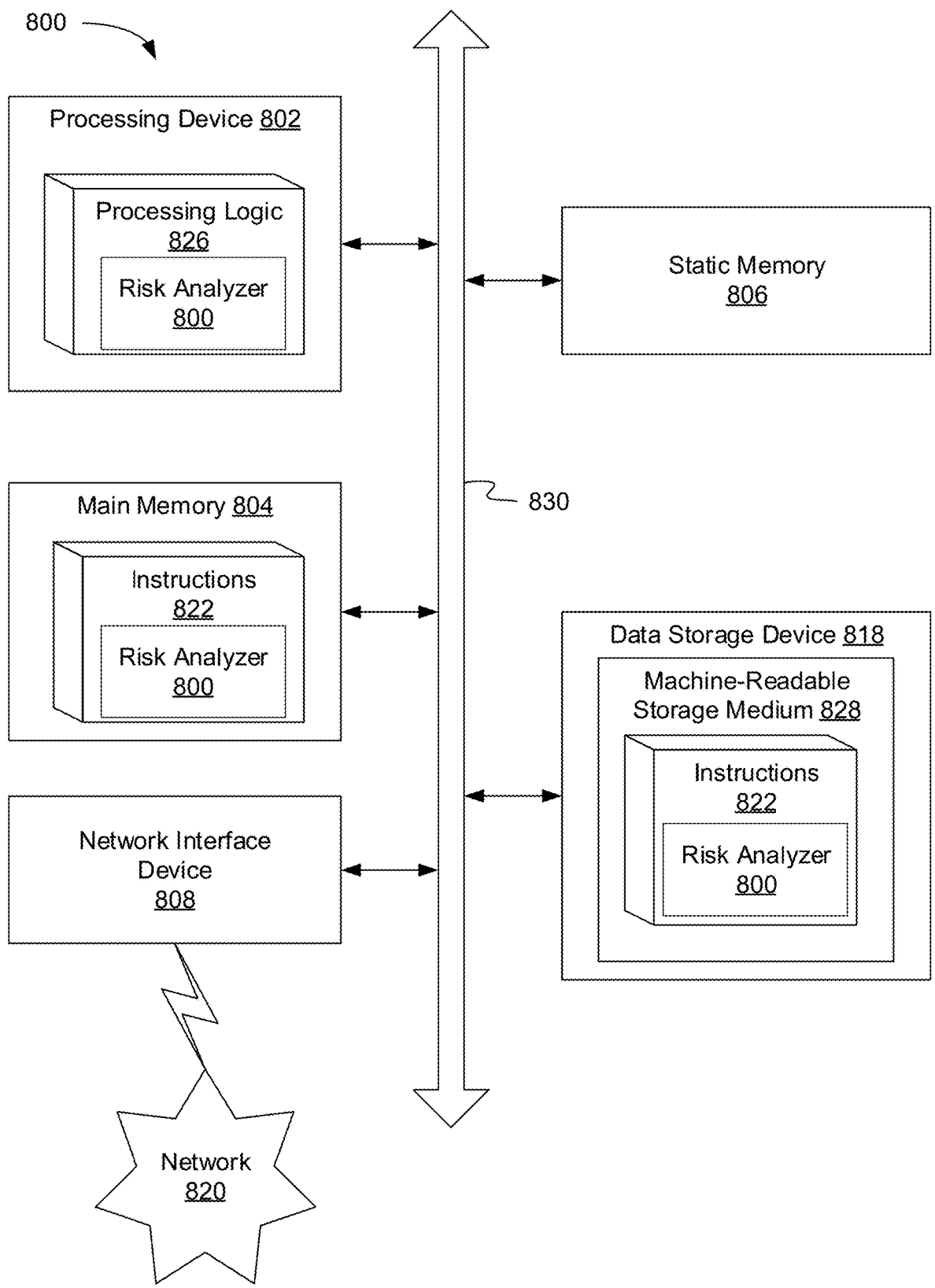
FIG. 8 is a block diagram illustrating an example computer system, in accordance with one implementation of the present disclosure.

FIG. 8 is a block diagram illustrating an example computer system, in accordance with one implementation of the present disclosure. FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as network monitor device 102 running classifier 700 to classification of one or more entities and determine one or more recommendations to improve classification, as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826, which may be one example of classifier 700 shown in FIG. 7, for performing the operations and steps discussed herein.

The data storage device 818 may include a machine-readable storage medium 828, on which is stored one or more set of instructions 822 (e.g., software) embodying any one or more of the methodologies of operations described herein, including instructions to cause the processing device 802 to execute classifier 700. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for classification (e.g., and classification improvement), as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein.

These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing network traffic from a network;
   selecting an entity;
   determining one or more values associated with one or more properties associated with the entity, wherein the one or more values are accessed from the network traffic;
   determining a classification of the entity;
   in response to the classification meeting a condition, determining, by a processing device, two or more properties that are unavailable in the network traffic, wherein the two or more properties are associated with determining the classification of the entity;
   determining a data source associated with the two or more properties that are unavailable in the network traffic;
   determining a data quality metric of the network traffic based on a combination of the two or more properties that are unavailable in the network traffic that are associated with determining the classification of the entity, and the data source associated with the two or more properties that are unavailable in the network traffic;
   storing an identification of the data source associated with the two or more properties that are unavailable in the network traffic; and
   performing, based on the data quality metric, a remediation action with respect to the data source associated with the two or more properties that are unavailable in the network traffic, wherein the remediation action is associated with one or more recommended actions, wherein the one or more recommended actions comprise at least one of changing a configuration of a switched port analyzer (SPAN) or mirror port, adding network infrastructure login information to provide access to network infrastructure, or accessing an updated profile library version comprising profiles against which the one or more values associated with the one or more properties are compared to classify the entity.

2. The method of claim 1, wherein the remediation action with respect to the data source associated with the two or more properties that are unavailable in the network traffic further comprises changing a configuration of one or more network devices.

3. The method of claim 1, wherein the two or more properties that are unavailable in the network traffic is associated with at least one of dynamic host control protocol traffic (DHCP), active scanning, hypertext transfer protocol (HTTP) traffic, a profile library being out of date, media access control (MAC) address, unidirectional traffic, or an address resolution protocol (ARP) table.

4. The method of claim 1, wherein the condition comprises at least one of a classification confidence value associated with the classification being below a threshold, a plurality of classifications associated with the entity, or an unknown classification of the entity.

5. The method of claim 1 further comprising:
   displaying a notification comprising a reference to the data source associated with the two or more properties that are unavailable in the network traffic.

6. The method of claim 5, wherein the notification comprises a message to perform a manual classification of the entity.

7. The method of claim 1 further comprising:
   accessing information associated with the entity from a system; and
   determining, by the processing device, one or more properties that are unavailable in the information from the system.

8. A system comprising:
   a memory; and
   a processing device, operatively coupled to the memory, to:
   access network traffic from a network;
   select an entity;
   determine one or more values associated with one or more properties associated with the entity, wherein the one or more values are accessed from the network traffic;
   determine a classification of the entity;
   in response to the classification meeting a condition, determine two or more properties that are unavailable in the network traffic;
   determine a data source associated with the two or more properties that are unavailable in the network traffic, wherein the two or more properties are associated with determining the classification of the entity;

determine a data quality metric of the network traffic based on a combination of the two or more properties that are unavailable in the network traffic that are associated with determining the classification of the entity, and the data source associated with the two or more properties that are unavailable in the network traffic;

store an identification of the data source associated with the two or more properties that are unavailable in the network traffic; and perform, based on the data quality metric, a remediation action with respect to the data source associated with the two or more properties that are unavailable in the network traffic, wherein the remediation action is associated with one or more recommended actions, wherein the one or more recommended actions comprise at least one of changing a configuration of a switched port analyzer (SPAN) or mirror port, adding network infrastructure login information to provide access to network infrastructure, or accessing an updated profile library version comprising profiles against which the one or more values associated with the one or more properties are compared to classify the entity.

9. The system of claim 8, wherein the remediation action with respect to the data source associated with the two or more properties that are unavailable in the network traffic further comprises changing a configuration of one or more network devices.

10. The system of claim 8, wherein the two or more properties that are unavailable in the network traffic is associated with at least one of dynamic host control protocol traffic (DHCP), active scanning, hypertext transfer protocol (HTTP) traffic, a profile library being out of date, media access control (MAC) address, unidirectional traffic, or an address resolution protocol (ARP) table.

11. The system of claim 8, wherein the condition comprises at least one of a classification confidence value associated with the classification being below a threshold, a plurality of classifications associated with the entity, or an unknown classification of the entity.

12. The system of claim 8, the processing device further to:

display a notification comprising a reference to the data source associated with the two or more properties that are unavailable in the network traffic.

13. The system of claim 12, wherein the notification comprises a message to perform a manual classification of the entity.

14. A non-transitory computer readable medium having instructions encoded thereon that, when executed by a processing device, cause the processing device to:

access network traffic from a network;
select an entity;
determine one or more values associated with one or more properties associated with the entity, wherein the one or more values are accessed from the network traffic;
determine a classification of the entity;
in response to the classification meeting a condition, determine, by the processing device, two or more properties that are unavailable in the network traffic, wherein the two or more properties are associated with determining the classification of the entity;
determine a data source associated with the two or more properties that are unavailable in the network traffic that are associated with determining the classification of the entity;
determine a data quality metric of the network traffic based on a combination of the two or more properties that are unavailable in the network traffic that are associated with determining the classification of the entity, and the data source associated with the two or more properties that are unavailable in the network traffic;
store an identification of the data source associated with the two or more properties that are unavailable in the network traffic; and
perform, based on the data quality metric, a remediation action with respect to the data source associated with the two or more properties that are unavailable in the network traffic, wherein the remediation action is associated with one or more recommended actions, wherein the one or more recommended actions comprise at least one of changing a configuration of a switched port analyzer (SPAN) or mirror port, adding network infrastructure login information to provide access to network infrastructure, or accessing an updated profile library version comprising profiles against which the one or more values associated with the one or more properties are compared to classify the entity.

15. The non-transitory computer readable medium of claim 14, wherein the remediation action with respect to the data source associated with the two or more properties that are unavailable in the network traffic further comprises changing a configuration of one or more network devices.

16. The non-transitory computer readable medium of claim 14, wherein the two or more properties that are unavailable in the network traffic is associated with at least one of dynamic host control protocol traffic (DHCP), active scanning, hypertext transfer protocol (HTTP) traffic, a profile library being out of date, media access control (MAC) address, unidirectional traffic, or an address resolution protocol (ARP) table.

17. The non-transitory computer readable medium of claim 14, wherein the condition comprises at least one of a classification confidence value associated with the classification being below a threshold, a plurality of classifications associated with the entity, or an unknown classification of the entity.

18. The non-transitory computer readable medium of claim 14, wherein the instructions, when executed by the processing device, further cause the processing device to:

display a notification comprising a reference to the data source associated with the two or more properties that are unavailable in the network traffic, wherein the notification comprises a message to perform a manual classification of the entity.

* * * * *